Aug. 20, 1957 P. M. THOMAS 2,803,356
PALLET HANDLER FOR CONCRETE BLOCKS
Filed June 29, 1956 3 Sheets-Sheet 1

INVENTOR.
PAUL M. THOMAS
BY
ATTORNEY

INVENTOR.
PAUL M. THOMAS

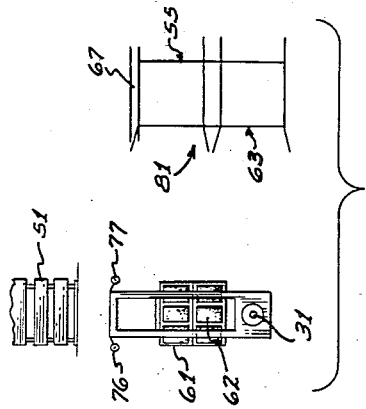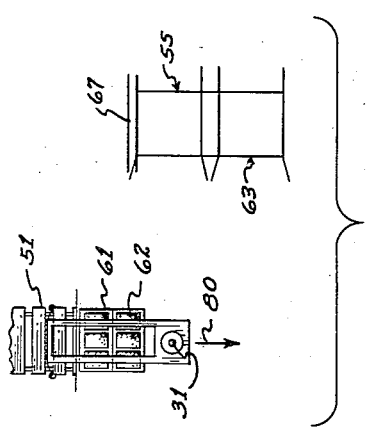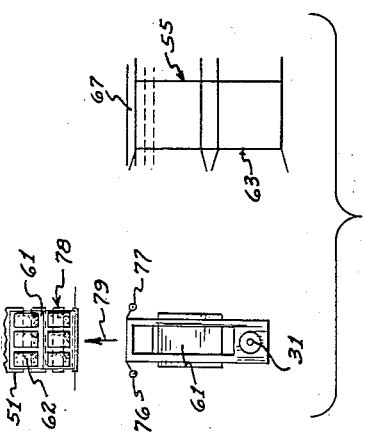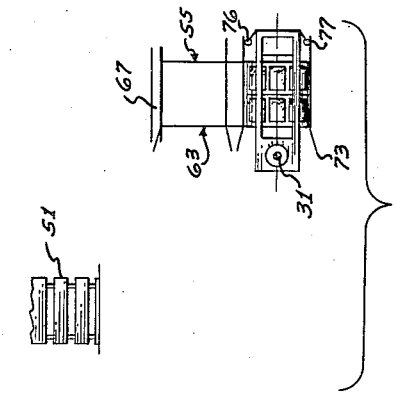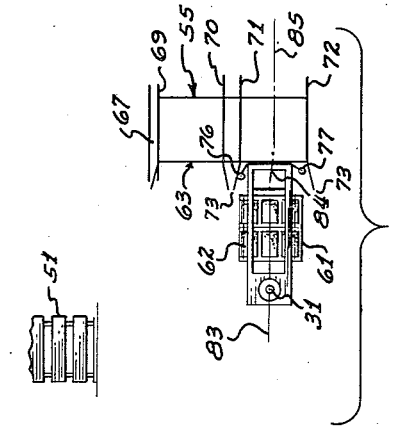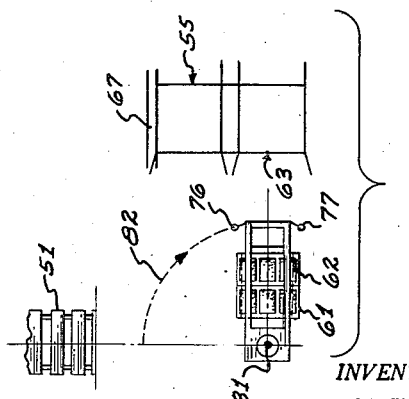
INVENTOR.
PAUL M. THOMAS

United States Patent Office 2,803,356
Patented Aug. 20, 1957

2,803,356

PALLET HANDLER FOR CONCRETE BLOCKS

Paul M. Thomas, Phoenix, Ariz., assignor to Builders Equipment Company, Phoenix, Ariz., a corporation of Arizona Application June 29, 1956, Serial No. 594,736

4 Claims. (Cl. 214—16.4)

This invention pertains to improvements in pallet handlers for manipulating concrete blocks from the block making machine to the pallet racks utilized in carrying the compelted molded concrete blocks to the steam curing and subsequent handling operations.

One of the objects of this invention is to provide a power operated machine for receiving the pallets containing the formed blocks from the block forming machine and depositing the loaded pallets in the pallet racks located at a position removed from the discharge point of the block making machines.

Still another object of this invention is to provide in conjunction with such a machine, means for automatically initially positioning the empty pallet racks with regard to the pallet handling machine in such a way that the loaded pallets carried by the machine are automatically guided into the racks by the machine without requiring accuracy of positioning of the empty pallet rack frames by the lift truck in critical relationship with the machine.

Still another object of this invention is to provide an improved pallet handler for receiving the molded concrete blocks on their pallets from the molding machines and to manipulate the blocks on said pallets automatically in a controlled guided manner into the pallet racks for subsequently handling the formed concrete blocks.

Still another object of this invention is to provide improved control means for positioning the pallet rack handler with regard to the pallet racks which is automatically controlled by the initial positioning of the pallet rack frames by the lift truck so that a high degree of accuracy of positioning of the pallet rack frames is not required to obtain rapid and automatic positioning of the pellets and formed blocks in the frames.

Further features and advantages of this invention will appear from a detailed description of the drawings in which:

Fig. 5 is a diagram showing the pallet handler ready to begin receiving pallets from the concrete block forming machine.

Fig. 6 is a diagram showing the pallet handler picking up a pallet with a set of six blocks thereon from the concrete block machine.

Fig. 7 shows the pallet handler with the pallet and blocks retracted from the block forming machine.

Fig. 8 shows the pivotal motion of the pallet handler swung into position to feed the loaded pallet into the pallet racks.

Fig. 9 shows the automatic control means for positioning the pallet handler in proper location to deposit automatically the loaded pallet directly in the pallet rack.

Fig. 10 shows the position of the pallet handler at the completion of the deposition of the loaded pallet into the pallet rack.

Figure 1:
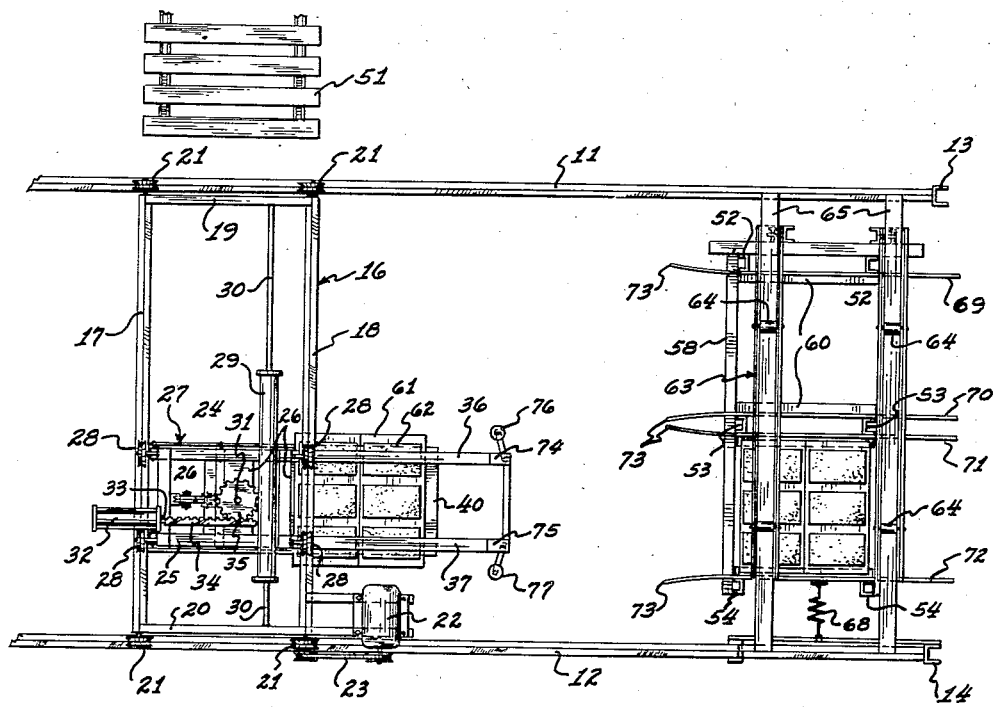
Fig. 1 is a plan view of a pallet handler machine incorporating the features of this invention.

As an example of one embodiment of this invention there is shown a pallet handling machine comprising a pair of spaced horizontal rails 11 and 12 supported on suitable upright standards 13 and 14 above the ground level 15. A first frame indicated generally at 16 comprising the transverse rail side members 17 and 18 and the end members 19 and 20 rigidly fixed to the outer ends of the members 17 and 18 is journaled on suitable rollers 21 carried on shafts suitably journaled in the frame 16 and running along on the rails 11 and 12. A suitable electric motor or other drive means 22 is connected through suitable power transmission means 23 to drive the rollers 21 to affect the longitudinal movement of the first frame 16 along the rails 11 and 12.

A second frame comprising the side members 24 and 25 and the connecting pieces 26 formed integral with the side members 24 and 25 of the second frame indicated generally at 27 is journaled on suitable rollers 28 rolling on the rails 17 and 18 of the first frame 16. A suitable fluid pressure cylinder or other motive means 29 has a piston rod 30 extending out each end of the cylinder 29 and rigidly connected at the outer ends to the end members 19 and 20 of the frame 16 so that by appropriately energizing the cylinder 29 the second frame 27 may be reciprocated along the rails 17 and 18 of the first frame 16 at right angles to the direction of travel of the frame 16 on the rails 11 and 12.

A vertically disposed rockshaft 31 is journaled against axial movement in the frame 27 and is rocked back and forth by a fluid pressure cylinder 32 fixed on the second frame 27 and having a piston rod 33 to which is fixed a rack 34 which is in mesh with the rack pinion 35 fixed to the rockshaft 31 so that energizing the cylinder 32 may affect rocking motion in the vertical shaft 31. Fixed to the vertically disposed rockshaft 31 is the pallet handler frame comprising the upper horizontal members 36 and 37 which are rigidly attached at their rear end to the downwardly extending frame members 38 and 39. Mounted to ride vertically up and down on the members 38 and 39 is the pallet supporting platen 40 having suitable rollers 41 rollingly engaging the members 38 and 39 in suitable vertical guided manner. An actuating cylinder 42 is rigidly attached to the cross member 43 rigidly fixed to the bottom ends of the frame members 38 and 39 and has a piston rod 44 on the upper end of which is mounted the pulley 45 over which operates the pole cable 46 having one end attached at 47 and its other end passing over an idler pulley 48 suitably journaled on the frame member 39 and extending downwardly and connected at 49 with the pallet supporting platen 40 so that energizing the cylinder 42 may vertically reciprocate the pallet supporting platen 40 up and down on the frames 38—39. Suitable means may be provided at 50 to engage under and securely hold the pallets as received from the conveyor or discharge point 51 of the concrete block making machine while suitable magnetic pickup means on the underside of the means 50 is adapted to pick up empty pallcts for return from the pallet racks to the molding machine.

Figure 2:
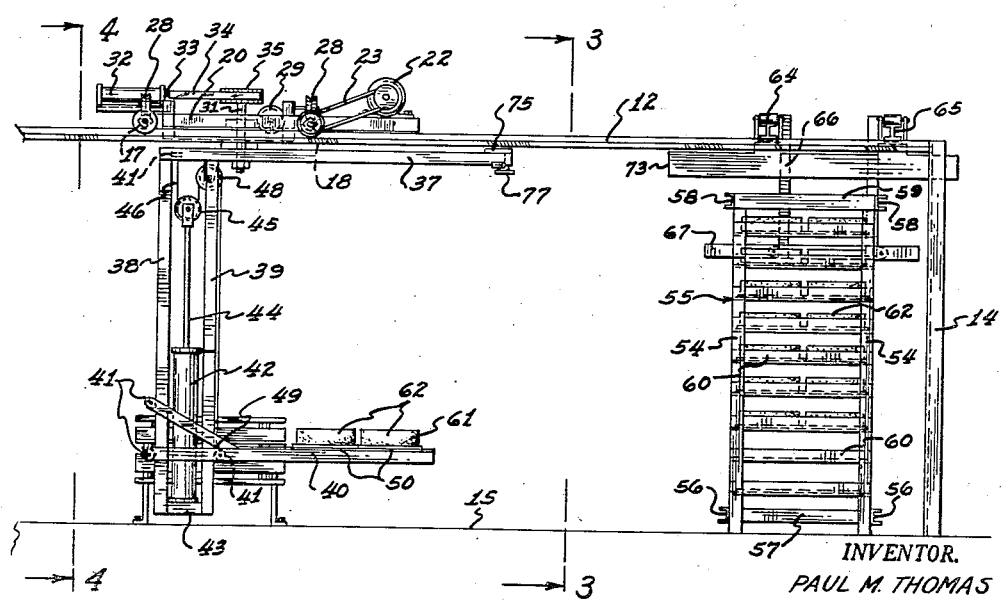
Fig. 2 is an elevation of the pallet handling machine shown in Fig. 1.
Figure 3:
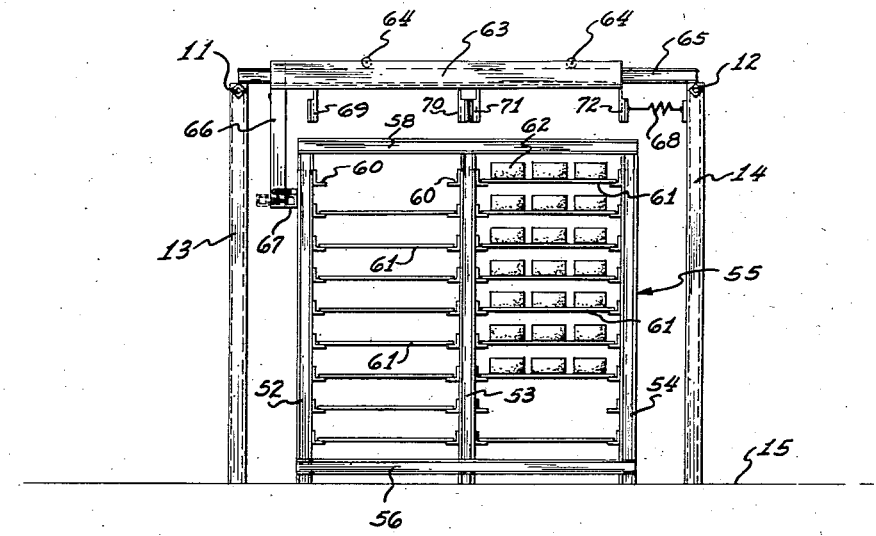
Fig. 3 is a section on the line 3—3 of Fig. 2.
Figure 4:
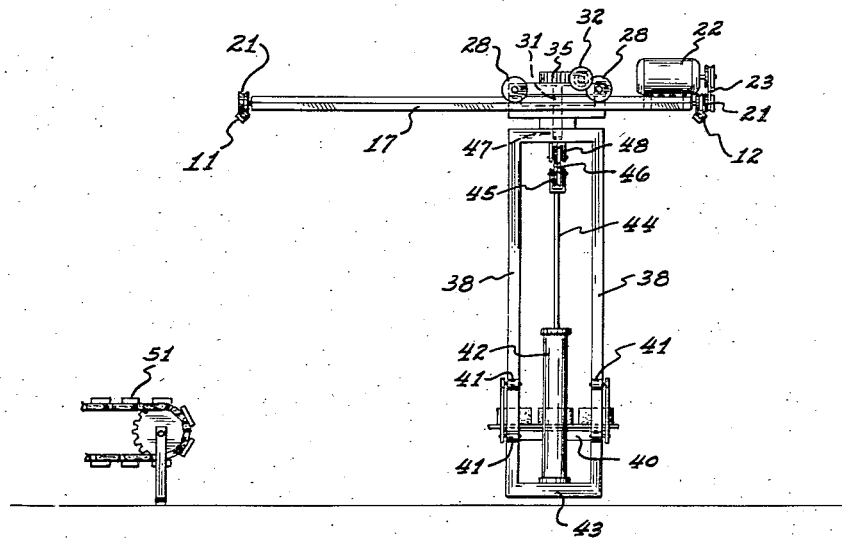
Fig. 4 is a section on the line 4—4 of Fig. 2.

The pallet racks in which the loaded pallets are to be deposited comprise the upright standards 52, 53 and 54, the pallet rack being indicated generally at 55. These upright standards are tied together at the bottom by the members 56 and 57 and at the top by the corresponding members 58 and 59. Fixed to the members 52, 53 and 54 are the guide rails 60 upon which the pallets 61 containing the formed blocks 62 are slid into the racks and supported thereon for the subsequent curing and handling operation. The clearance between pairs of pallet guide rails 60 and the edges of the pallets is relatively close so as to maintain the pallets in proper and substantial parallelism when presented on the racks and for subsequent handling. As a result, it has heretofore been found difficult to position the pallet racks 55 in a particular location with respect to handling devices receiving the pallets from the block making machine with the result that a great deal of lost time, damage to the cement blocks, and interruption of a smooth flow of work has resulted. In order to overcome these former difficulties there has been provided a servo control mechanism operating in conjunction with the above described pallet handler for automatically bringing the pallets 61 and blocks thereon carried on the pallet supporting platen 40 into precise alignment with the racks 55 and the respective guide rails 60—60 during the loading up operation of the racks 55. This mechanism may be operated mechanically, hydraulically, pneumatically, or by electric means such as photoelectric cell control or electronic controls as desired, the basic structure including a control template member 63 which is slidably mounted on suitable guide rollers 64 on the transverse rails 65 carried on the upright standards 13 and 14 and the rails 11 and 12 as best shown in Figs. 2 and 3. Rigidly fixed to one end of the control template member 63 is the downwardly extending arm 66 having the pallet rack engaging bar 67. Suitable means such as the tension spring 68 connected between the member 63 and the upright supports 14 serves to bias or normally move the member 63, to the right, in Fig. 3 to bring the pallet rack engaging bar up against the side of the pallet rack 55 in such a manner that as the rack 55 is moved in from the right, Fig. 3, by suitable lift truck, the rack initially engages the bar 67 and pushes the member 63 to some intermediate position on the transverse rails 65 such that it is not critically necessary to very accurately stop the position of the pallet racks 55 on the ground 15 with the lift truck.

Associated with the control template member 63 are the guide blades 69, 70, 71 and 72 which extend parallel to the guide rails 60—60 of the racks 55 but may preferably be arranged to diverge outwardly at their outer ends 73 as best shown in Fig. 1, or they may be made parallel at their outer ends as desired. On the outer ends of the members 36 and 37 are control limit switches 74 and 75 having their respective control arms 76 and 77 which are adapted to engage the respective sides of the guide blades 69—71 and 70—72 as the pallet handler is moved toward the pallet rack 55 to be loaded. The limit switch 74 when its control arm 76 is swung inwardly controls power to the cylinder 29 so that the second carriage 27 moves in a direction to again restore said limit switch 74 to inoperative position, that is, to move it away from the respective guide blades 69 and 71. Likewise the control arm 76 of limit switch 75 when depressed causes the cylinder 29 to move in the opposite direction relative to the guide blades 70 and 72.

Appropriate electrical control and interlocking mechanism to carry out any and all of the functions recited above may be utilized, the details of which electrical apparatus is of conventional practice and forms no part of this invention.

Referring particularly to Figs. 5 through 10 inclusive, the rocking cylinder 32 is energized so as to swing the pallet supporting platen to the position to be moved to the block making machine conveyor or discharge point 78 as best shown in Fig. 5. When in this position cylinder 29 is energized to move the second carriage 27 in the direction indicated by the arrow 79 to bring the pallet holders 50 in position to pick up the pallet 61 and the blocks 62 from the block making machine. Having thus picked up the pallet 61 cylinder 29 is then energized in the opposite direction as indicated by the arrow 80 in Fig. 6 withdrawing the pallet loaded with blocks from the block making machine. This movement in the direction indicated by the arrow 80 continues to the point shown in Fig. 7. In the meantime a loaded pallet rack 55 has been removed from the loading position 81 and an empty pallet rack 55 with empty pallets has been brought into position. The empty rack 55 is backed up against the pallet rack engaging bar 67 which pushes the bar 67 part way along its transverse rails 65 to any convenient stopping position in the direction of these rails. Thus a high degree of accuracy of stopping the lift truck with the pallet rack on it is not required as an approximation, just sufficient to effect positive contact between the pallet rack engaging bar 67 and the end members or upright standards 52 of the empty pallet rack being required. It will be noted that there is a fixed distance between the abutment face of the pallet engaging bar 67 and the guide blades 69, 70, 71 and 72 so that there will always be an exact relationship between these guide blades and the respective guide rails for the pallets in the pallet racks 55.

Thus, with the empty pallet rack located as stated the cylinder 32 is then energized to swing the pallet supporting platen in the direction indicated by the arrow 82 in Fig. 8. Motor 22 is then energized to move the entire handling unit, to the right in Fig. 8, to the position shown in Fig. 9 wherein one or the other of the limit switches 74 and 75 with their respective contact arms 76 engage the guide blades 69, 70, 71 and 72. In the particular illustration the unit moves in the direction indicated by the broken line 83 and it so happens that the empty pallet rack has been positioned somewhat to the right of this direction of movement as seen in Fig. 9 so that the control arm 76 of limit switch 74 first engages the divergent end 73 of the guide blade 71. This causes cylinder 29 to be energized to move the second carriage 27 in conjunction with the movement of the first carriage 16 by the motor 22 so that the carriage at this point travels in the angular direction indicated by the line 84 in Fig. 9. Finally, arm 76 of limit switch 74 is then relieved or in just initial contact with the guide blade 71 and likewise the arm 75 of limit switch 76 is in normal initial contact with the guide blade 72. This condition then deenergizes cylinder 29 and causes the pallet handler to now follow again a straight line indicated at 85 which is parallel to and in correct alignment with the respective guide rails 60 of the empty pallet rack which causes the pallet to nicely slide into position on the empty rack. It is obvious that by properly energizing cylinder 42 any desired set of guide rails 60 may be selected in the empty rack for deposition of the pallet loaded with the just formed blocks. Thus the pallet handler finally arrives at the position shown in Fig. 10 to fully deposit the pallet on the guide rails 60 whereupon the loaded pallet is lowered on the guide rails 60 and released from the pallet supporting platen 40 as it moves downwardly. Further lowering of the platen causes its magnetic pickup to grip the empty pallet below and the unit then returns back to the position shown in Fig. 8 depositing the empty pallet in the block machine and then to position shown in Fig. 5 to repeat the cycle.

Thus there is provided first of all a means for initially positioning the empty pallet racks and empty pallets without requiring great accuracy the positioning of the empty pallet rack with respect to the pallet handler unit. Secondly, there is provided means on the pallet handler unit which may take the form of the limit switches 74 and 75 and the respective arm 76 engaging the respective guide blades 69, 70, 71 and 72 as described for finally initially hunting or orienting by a servo-control the exact position of the pallet holder with respect to the guide rail 60 on the empty pallets so that the pallets may be quickly and automatically to effect a very rapid and efficient maneuvering of the loaded pallets from the block making machine to the empty pallet racks and the return of the empty pallets to the block making machine. Thus the combination of the initial positioning of the control members 69, 70, 71 and 72 and the servo-mechanism 74, 75 and 76 comprise a combination effecting very efficient and easy handling of loaded pallets from the forming machine to the conveying mechanism associated with the apparatus. As pointed out, it is again repeated that any form of servo-mechanism may be utilized to carry out the above cited operations be it electronic, hydraulic, pneumatic, or mechanical or any suitable well known means.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. In a pallet handling apparatus for concrete blocks, means for initially positioning a pallet rack to be loaded by engagement with a yielding pallet rack engaging member having locating guide blades rigidly connected to said pallet rack engaging member in a predetermined position relative to the guide rails for the pallets in said pallet racks, means for receiving loaded pallets from the block making machine and for depositing said loaded pallets on said guide rails in said pallet racks, power means for actuating and positioning said means for receiving loaded pallets, said power means being positionally controlled by means on said means for receiving loaded pallets engaging said guide blades on said yielding pallet rack engaging member including servo-mechanism to accurately and automatically position the loaded pallets on said guide rails for said pallet racks.

2. A pallet handling apparatus including a pallet rack to be loaded, yielding positioning means engaging said pallet rack, locating guide blade means fixed to said yielding positioning means in a predetermined position relative to the pallet guide rails of the pallet rack when said pallet rack is in engagement with said yielding positioning means, a pallet supporting platen movable between a block making machine and said pallet rack, and servo control means for said platen actuated by contact with said guide blade means to automatically position said platen relative to the pallet guide rails of said pallet rack.

3. A pallet handler including a first frame movable to and from a pallet rack to be loaded, a second frame movable on said first frame at right angles to the direction of movement of said first frame, a platen frame pivotally mounted about a vertical axis of rocking movement on said second frame, a pallet supporting platen vertically reciprocable on said platen frame, means positioned by a pallet rack to be loaded, and servo control means carried on said platen frame operatively engaging means positioned by said pallet rack to regulate the position of said second frame relative to said pallet rack.

4. A pallet handler including a first frame movable to and from a pallet rack to be loaded, a second frame movable on said first frame at right angles to the direction of movement of said first frame, a platen frame pivotally mounted about a vertical axis of rocking movement on said second frame, a pallet supporting platen vertically reciprocable on said platen frame, means positioned by a pallet rack to be loaded, means for reciprocating said second frame on said first frame, control means on said platen frame for said last mentioned means, and means on said means positioned by a pallet rack to be loaded for actuating said control means during the movement of said platen into said pallet rack.

References Cited in the file of this patent
UNITED STATES PATENTS

| | | |
|---|---|---|
| 1,518,278 | Schroeder et al. | Dec. 9, 1924 |
| 2,620,932 | Alpine | Dec. 9, 1952 |